United States Patent [19]
Carstensen

[11] Patent Number: 5,689,871
[45] Date of Patent: Nov. 25, 1997

[54] COUPLINGS FOR STANDARD A.P.I. TUBINGS AND CASINGS AND METHODS OF ASSEMBLING THE SAME

[76] Inventor: Kenneth J. Carstensen, 4540 N. 44th St. No. 70, Phoenix, Ariz. 85018

[21] Appl. No.: 664,169

[22] Filed: Jun. 14, 1996

Related U.S. Application Data

[63] Continuation of Ser. No. 396,078, Feb. 28, 1995, abandoned, which is a continuation of Ser. No. 156,110, Nov. 22, 1993, abandoned, which is a division of Ser. No. 954,683, Sep. 30, 1992, Pat. No. 5,263,748, which is a continuation of Ser. No. 345,653, May 1, 1989, abandoned, which is a continuation-in-part of Ser. No. 117,682, Nov. 5, 1987, Pat. No. 4,878,285, which is a division of Ser. No. 802,943, Nov. 27, 1985, Pat. No. 4,706,997, which is a continuation of Ser. No. 379,615, May 19, 1982, abandoned.

[51] Int. Cl.$^6$ ..................................................... B21K 21/16
[52] U.S. Cl. ........................ 29/401.1; 29/407.05; 29/450; 29/456
[58] Field of Search ..................... 29/401.1, 407.01, 29/407.05, 435, 450, 451, 456, 525.11; 285/333, 334

[56] References Cited

U.S. PATENT DOCUMENTS

| | | |
|---|---|---|
| 1,590,357 | 6/1926 | Feisthamel . |
| 1,731,171 | 10/1929 | Miller ........................................ 285/333 |
| 1,859,311 | 5/1932 | McEvoy, Jr. .............................. 285/333 |
| 1,889,868 | 12/1932 | Montgomery . |
| 2,150,221 | 3/1939 | Hinderliter . |
| 2,320,107 | 5/1943 | Speckert . |
| 2,380,690 | 7/1945 | Graham . |
| 3,266,821 | 8/1966 | Safford . |
| 3,307,860 | 3/1967 | Blount et al. ............................. 285/334 |
| 3,339,945 | 9/1967 | McCrory, Jr. . |
| 3,497,246 | 2/1970 | Weiner ..................................... 285/333 |
| 3,572,777 | 3/1971 | Blose et al. .............................. 285/334 |
| 3,850,461 | 11/1974 | Fujioka et al. . |
| 4,127,927 | 12/1978 | Hauk et al. . |
| 4,459,731 | 7/1984 | Hutchison .................................. 29/451 |
| 4,507,842 | 4/1985 | Werner ...................................... 29/451 |
| 4,537,406 | 8/1985 | Hirasuna et al. ........................ 285/334 |
| 4,679,831 | 7/1987 | Kielminski .............................. 285/333 |
| 4,872,253 | 10/1989 | Carstensen ............................. 29/527.1 |

*Primary Examiner*—David P. Bryant
*Attorney, Agent, or Firm*—Merchant, Gould, Smith, Edell, Welter & Schmidt

[57] ABSTRACT

A pipe coupling system including a modified collar (12) into which a first pipe (40) and a second pipe (30) are inserted. In a first embodiment, a ring (22) resides within the collar which can serve as a torque shoulder or a metal to metal seal. In a second embodiment, a composite element (22') is formed of three concentric rings, a first ring (41) being composed of a Teflon® like material, a second ring (44) being composed of a Torlon® or Peek® like material, and a third ring (42) composed of a Teflon® like material. The adjoining surfaces (60,61) of the rings (41,42,44) form leakage paths to relieve accumulated pressure within the collar thread voids (51). A slip on gauge (52) is disclosed for prescreening pipe to insure that it is within the tolerances required for the present system. A bucking plug (8) is disclosed for insuring that the first pipe (40) is inserted within the collar (12) to the proper depth.

7 Claims, 9 Drawing Sheets

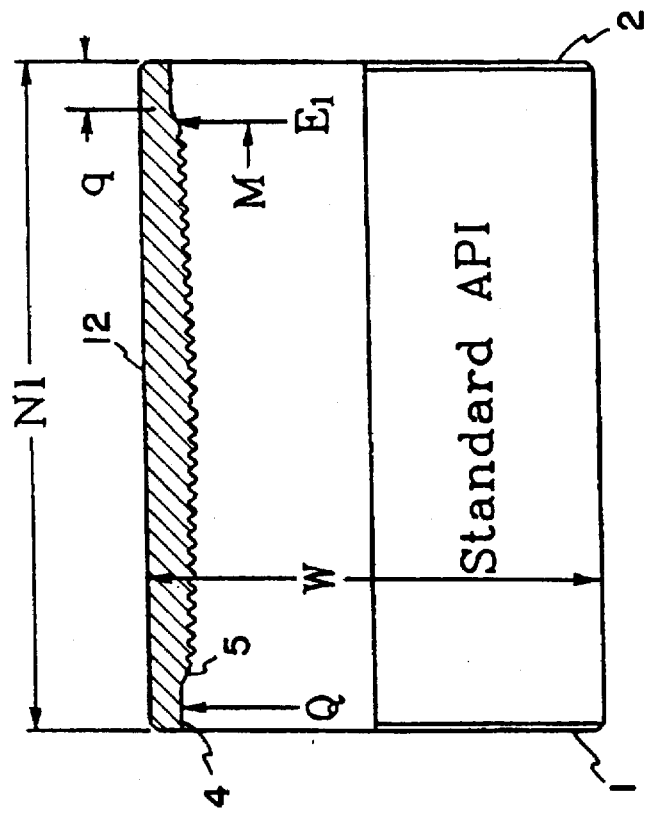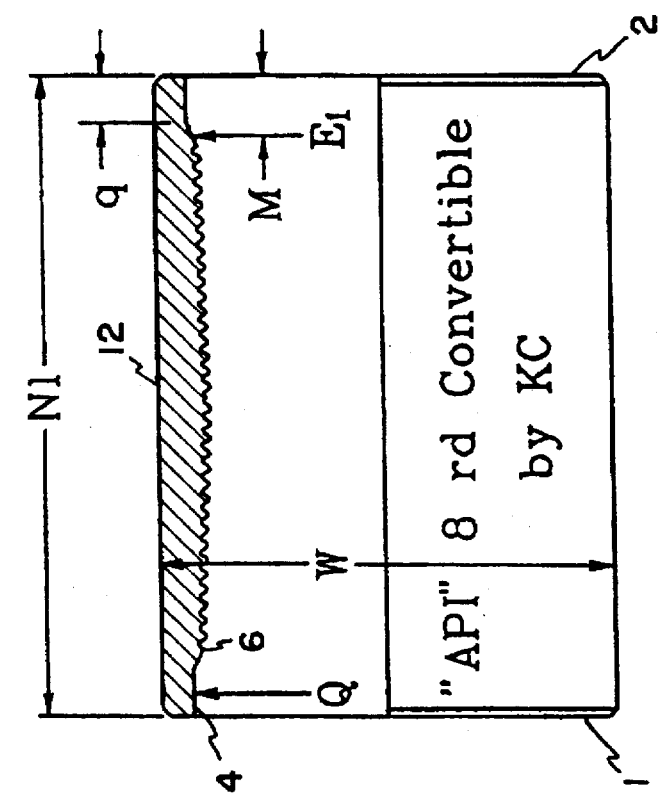
FIG. 7A
FIG. 7B

COUPLINGS FOR STANDARD A.P.I. TUBINGS AND CASINGS AND METHODS OF ASSEMBLING THE SAME

This is a File Wrapper Continuation of application Ser. No. 08/396,078, filed Feb. 28, 1995, abandoned, which is a File Wrapper Continuation of application Ser. No. 08/156,110, filed Nov. 22, 1993, abandoned, which is a division of application Ser. No. 07/954,683, filed Sep. 30, 1992, now U.S. Pat. No. 5,263,748, issued Nov. 23, 1993, which is a File Wrapper Continuation of application Ser. No. 07/345,653, filed May 1, 1989, abandoned, which is a continuation-in part of Ser. No. 07/117,682, filed Nov. 5, 1987, now U.S. Pat. No. 4,878,285, issued Nov. 7, 1989, which is a division of application Ser. No. 06/802,943, filed Nov. 27, 1985, now U.S. Pat. No. 4,706,997; issued Nov. 17, 1987, which is a continuation of application Ser. No. 06/379,615, filed on May 19, 1982, abandoned.

BACKGROUND OF THE INVENTION

This invention relates to couplings using standard A.P.I. tubings or casings, and more particularly to systems and methods for upgrading the applicable uses of standard tubings and casings under a variety of field conditions and for a variety of applications.

The oil and gas industry standardized many years ago on certain grades and types of tubing and casing, as a result of studies and the adoption of standards by the American Petroleum Institute (A.P.I.). As a result of their determinations, weights, grades and thread characteristics for tubing or casing (pins) and the intercoupling collars (boxes) were established. This afforded the degree of predictability needed as to when and what tubular goods could be used in a given downhole pressure and tension application. While conditions in the oil and gas fields are too variable and stringent to provide perfect assurance of feasibility in every situation, the standards were found to provide adequate reference points and reliable operation under most conditions under the circumstances then applicable. These circumstances involved shallower wells and less demanding environments than are presently encountered as the increasing search for oil and gas resources has carried drilling to far greater depths than formerly attempted. Nonetheless, A.P.I. EUE 8 inch round threaded and coupled tubing has been used by the industry for many years, and continues to be used widely. It is not only an A.P.I. standard but is available worldwide and this tubing and casing provides tough, rugged operation that will survive transporting, that is, rig floor handling and make-up, much better than its counterparts. In an upset (thickened end) version, the A.P.I. standard provides excellent tension and bending performance that can readily handle most load cycles with a long useful life. Furthermore, the tubular goods can be economically cut or recut, and can be repaired with readily available equipment in most applicable locales in the world. However, when it is desired to achieve a higher level of performance, the tendency is to use a "premium grade" of tubing, typically using special configurations of threads and seals, at substantially greater expense. Very often, such premium grade tubular goods must be processed specially with such precision that they can only be prepared in special factory installations, and must be transported back and forth in order to be kept in use. Consequently, the tendency has been to utilize this type of product only when its use is otherwise unavoidable.

The cost of tubing or casing alone, while very significant to the economics of oil and gas well production, is but a part of the overall expense involved. The grade and type of tubing needed for a well cannot be precisely ascertained until after the drilling has been carried out and the well logged. Only then can the operator be sufficiently assured of the down hole conditions to select a grade and type of tubular goods for use. An inventory of A.P.I. standard goods will be on hand, but it is uneconomic to maintain different premium pipes and a range of coated goods on site. Thus it has been necessary to transport goods (called "Movements") repeatedly for processing, including bucking off, bucking on and machining. The costs of these movements are a major factor in well production expenses. Adding an internal coating or a lining to A.P.I. pipe can often be done in the field because of the availability of equipment for this purpose.

A.P.I. tubing has certain limitations, resulting in part from the fact that it has leak paths designed into the thread configuration, which must be blocked by the internal thread lubricant, which contains solids for that purpose. The effectiveness of the damming action is variable and uncertain. In addition, the tolerances on the A.P.I. pins and boxes are relatively wide, so that a problem constantly exists in assuring proper make-up of the couplings. Under these circumstances, therefore, a separate industry using high technology approaches has been devised for instrumenting and monitoring pipe make-up, using torque measurements, seal checks, and other expedients. Nonetheless, the proper make-up remains dependent on the dimensions of the mating pin and box. With random assembly in the field, problems continue to exist.

Given these considerations, applicant has previously devised a coupling system for A.P.I. standard pipe in which the pins remain unchanged, so that the available tubing and casing inventory can be used, but a coacting collar having a central positioning ring, either integral with or insertable into the collar, together with inner and outer seals, is utilized. The seals are disposed adjacent to the reference shoulder defined by the inner ring, in a groove in the collar, and in a groove in the end recess portion of the collar. This arrangement provides a highly satisfactory form of coupling and enables the widespread usage of A.P.I. tubing on a reliable basis, with ready make-up characteristics.

The search for superior forms of coupling, however, is never ending. A variety of field problems of different natures are constantly being encountered. Analysis of the stresses acting on the coupling system using the inner and outer seals has revealed that certain limitations are presented because, even though the tubular goods are unmodified, the presence of the seal and the necessary grooves which were retaining them impose certain limitations. For example, the seal itself, when "energized" or stressed by the entry of the pin into the box, tends to deflect the pin laterally, especially when the system is pressurized. Additionally, the seal groove can allow, under these highly stressed conditions, bending at the collar. Furthermore, the seals, which must be of high temperature and high corrosion resistance, add substantially to the cost of the unit even though it is superior to the prior designs. The use of the integral collar or stop shoulder presents an additional problem, because the stresses interior to the coupling can thus be unequal, inasmuch as they are not transmitted from one pin to the opposed pin through the ring.

It has been ascertained, however, that the metal-to-metal contact in this configuration provides a degree of sealing under many conditions, in response to high pressure differentials. Investigating this further, it has also been ascertained that this metal-to-metal seal characteristic involves complex factors. Overstressing during make-up can lead to nonelastic deformation and galling. Without sufficient metal-to-metal preload stress, the completed string may totally relieve the metal-to-metal pressures, resulting in a leakage path. There are limitations on what can be done in this respect, inasmuch as the tong forces available are typically limited, and cannot exceed certain values in any event.

As another example of the conditions which must be met by a low cost coupling utilizing A.P.I. tubular goods in a pipe string, there are a variety of situations in which a given collar might be used. In some situations, it is satisfactory to leave the central area (the so-called "J-area") between the pin ends open. In others, which might be called the "smooth bore" configuration, it is desirable to have a central ring only for dimensional control as well as providing a uniform flush interior diameter between the tubular goods and the intervening collar. In a more demanding application, it is desired to have a metal-to-metal seal that will retain its integrity under the highly stressed conditions that might be encountered. In a 12,500 foot well, for example, 8 inch round pipe of a typical grade will place 700,000 lbs. of tensile force on the uppermost collars, which must be borne by the threads at that position. Further, much A.P.I. standard pipe is internally protected in some way, because of the conditions to be encountered. Some are coated with a plastic liner by a spray infusion process, others are internally coated by an internal liner which adheres to the sides of the tubing and around the nose ends, and still others have a liner of high temperature cement. It is desirable that the mechanical, make-up and sealing characteristics be attainable using essentially the same collars, but employing only a minimum of variation, objectives which have not heretofore been achieved in any measurable degree with an economic coupling system. The A.P.I. standard defines a "last scratch" mark which is used as a dimensional guide for controlling markup under low stress, low pressure conditions. The vastly more demanding conditions which must now be met for many wells, together with the wide tolerances for A.P.I. goods, however, has required the use of torque measurements, post makeup testing, premium couplings, and other techniques. All of these add expense in the form of materials or testing costs. Dimensional makeup approaches have been recognized to be desireable, but heretofore the means have not been available for using dimensional control to use A.P.I. standard tubular goods for a variety of standard and upgraded conditions. By "dimensional control" is meant both physical references, such as makeup to a reference mark, the hand tight plane or a reference shoulder engagement, and makeup to a specified number of turns past such a reference.

SUMMARY OF THE INVENTION

Couplings and methods of coupling in accordance with the invention incorporate a collar or box in which both the dimensions of the body and the dimensions and placement of the thread, as well as the thread taper and pitch diameter location, are precisely determined, along with a central thread region having flattened crests lying in a given circumference within the collar. This arrangement, along with prescreening of A.P.I. tubing or casing to insure that the cumulative dimensional limits of the threaded region are within particular constraints, assures adequate bearing engagement with dimensional positioning. Further, the collar is adaptable to a range of applications, because the gap between inserted pin ends can be open, or filled by a center ring press fit into the region of flattened thread crests to provide torque shoulders for make-up of the pin ends to the selected depth of penetration into the box. Alternatively, a more precisely finished reference ring may be press fit into position, and used to provide metal-to-metal seals with both pins. In this instance, the axial dimension of the ring is almost precisely 0.880 inches, and the pins are torqued to the desired inserted position by being turned approximately 2.48 turns after reaching the handtight plane. The "floating" ring in the central region assures equal distribution of stresses in both directions, and torque make-up to this extent provides preloading in the range of 3-4 times greater than the stress to be encountered on the string, while maintaining the torque within the limits of most available tong systems.

For coated pipe, the ring which is inserted may comprise a multi-part ring having synthetic resin ends and a rigid center, in a preferred example these being of "Teflon®" at the ends and "Torlon®" or "Peek®" at the center. The inner surface of the synthetic resin rings is slightly concave, so that when the preloading stress is applied the surface deforms to an essentially flat level flush with the inner diameter of the tubular goods. The contact (but not affixed) surfaces between the "Teflon" and "Torlon" provides an important function of pressure relief, inasmuch as gases at high pressure permeate slowly through resin materials, to form high pressure pockets in the grooves of the threads, which could cause internal implosion of the rings when the interior pressure within the system is relieved at a rate much faster than permeation back through the synthetic resin. This configuration of ring is used for plastic lined, PVC lined and cement lined pipes, and can be configured to receive the nose end of the pin, whether it is flat (as is used with PVC lined and cement lined) or bullet-nosed (as is used with plastic lined) pipe.

To maintain the desired pressure relationship for the metal-to-metal seal, a minor modification may be made to the nose end of heavy grades of pipe, to introduce a taper or a ridge, reducing the surface area for contact and increasing the pressure. Under these circumstances, and under normal circumstances with thinner pipe, the needed pressure levels are reached in the preloaded state to maintain the appropriate contact pressure when subjected to the tension induced by the weight of the pipe string. Furthermore, when analyzed according to Von Mises equivalent stress equation which is generally used in stress analysis for oil and gas well couplings, acceptable sealing pressures are obtained, while equivalent stress levels do not exceed 90% of the yield strength of the materials (ductile steel) involved.

BRIEF DESCRIPTION OF THE DRAWINGS

A better understanding of the invention may be had by reference to the following description, taken in conjunction with the accompanying drawings, in which:

FIG. 7A is a fragmentary view, partly in section of a collar in accordance with the invention, showing by alphabetic designations the different dimensions referenced in Table A of the specification;

FIG. 7B is a fragmentary view, partly in section, of a collar, showing, by alphabetic designations, the different dimensions referenced with respect to standard 8" round A.P.I. pipe in Table A of the specification;

DETAILED DESCRIPTION OF THE INVENTION

Figure 1:
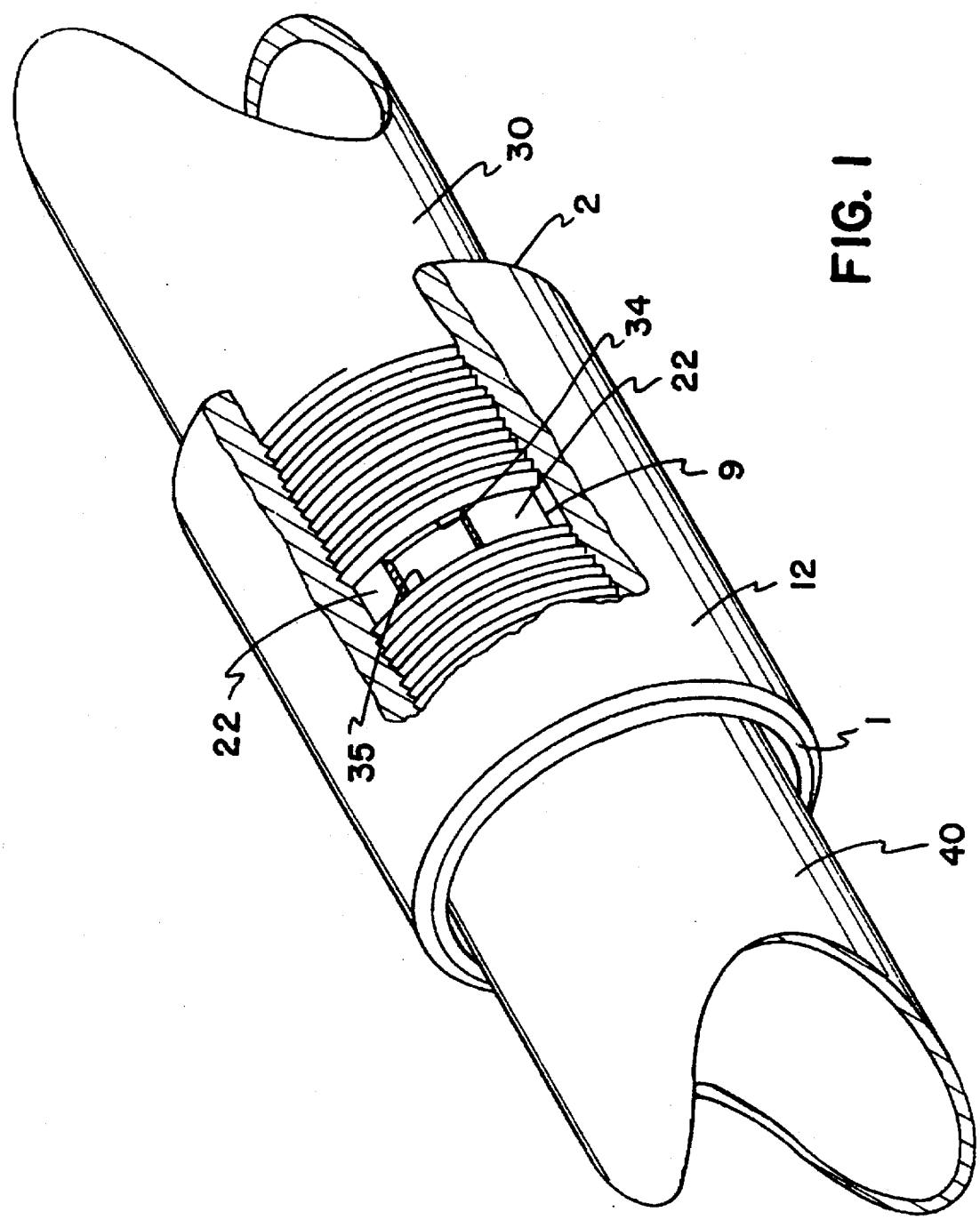
FIG. 1 is a perespective view, partially broken away, of a coupling in accordance with the invention.
Figure 2:
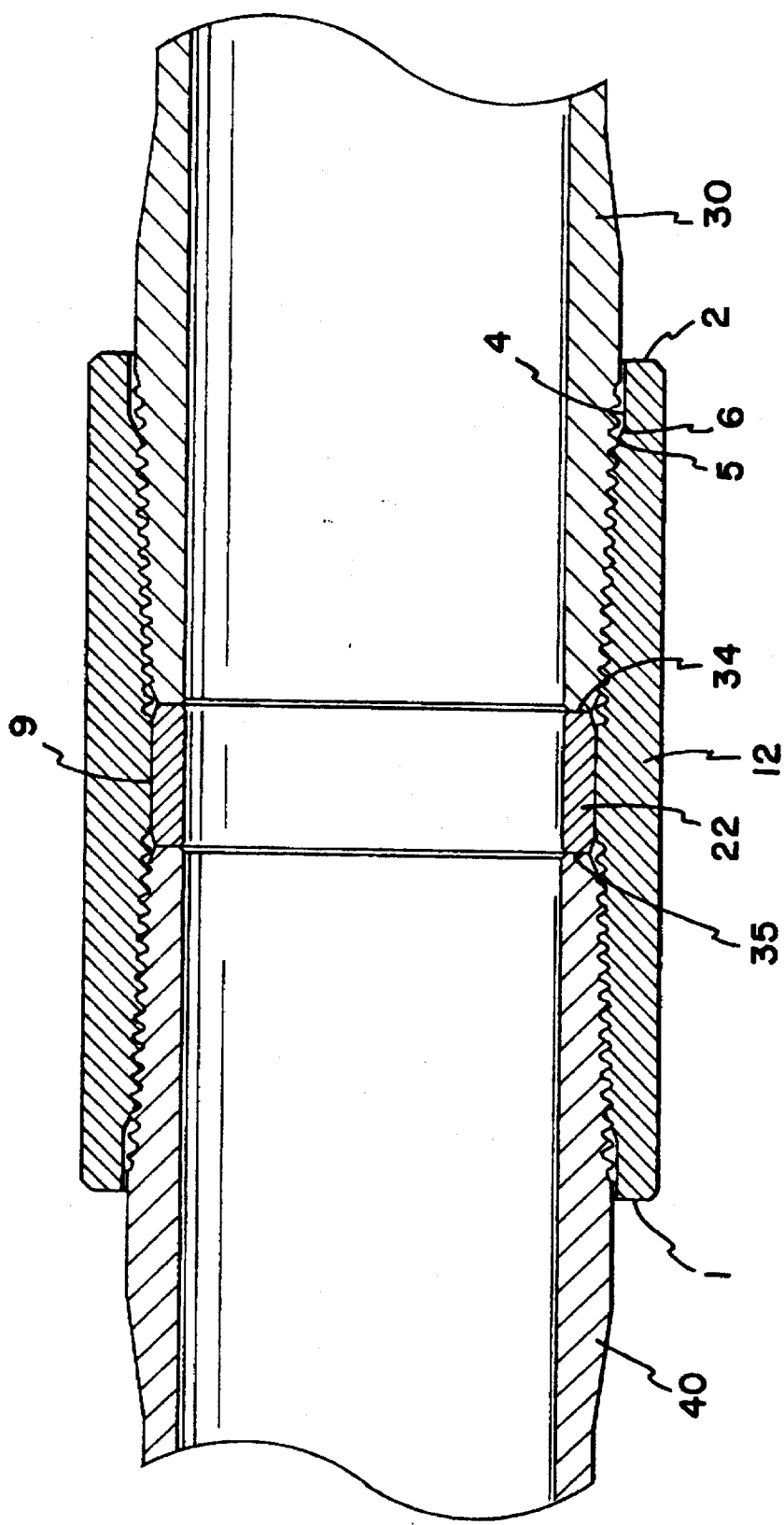
FIG. 2 is a side-sectional view of the arrangement of FIG. 1, as used with an insert ring for providing an axial metal-to-metal seal and the torque shoulder.
Figure 3:
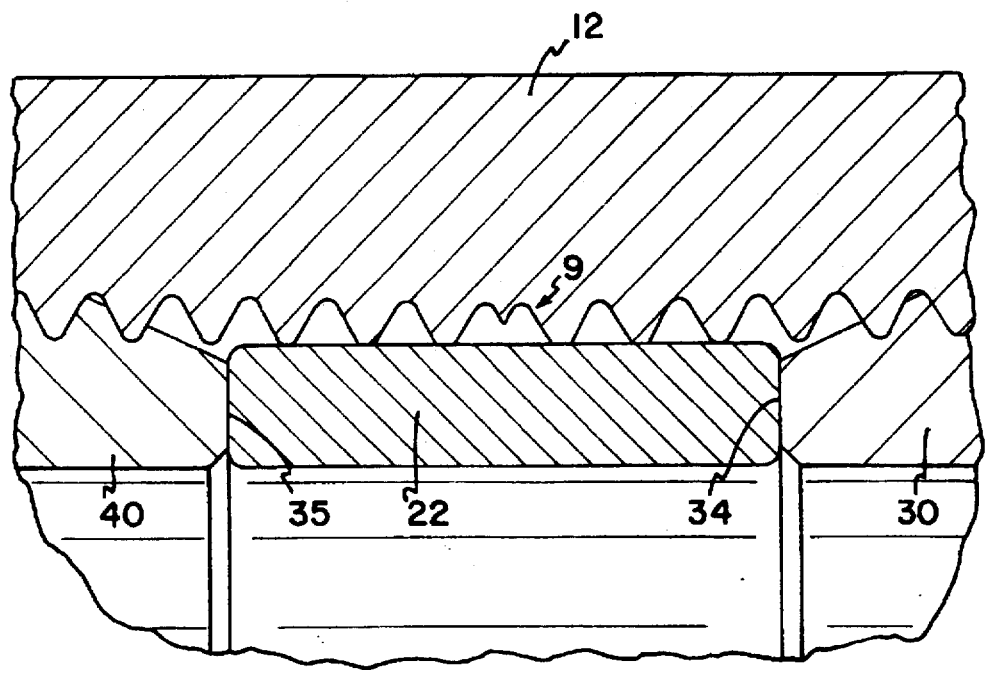
FIG. 3 is a side-sectional view of a fragment of the arrangement of FIGS. 1 and 2, showing in greater detail the manner in which the threads are truncated relative to the central ring.
Figure 5:
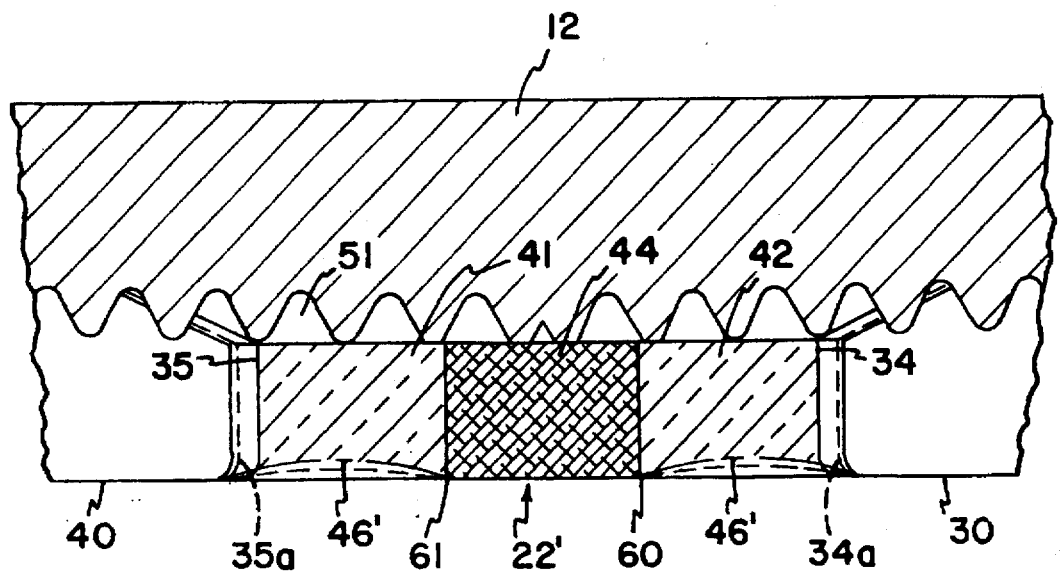
FIG. 5 is a fragmentary, side-sectional, view of the coupling of FIG. 1, showing the insert ring utilized for PVC lined and cement pipe, having flat noses.
Figure 6:
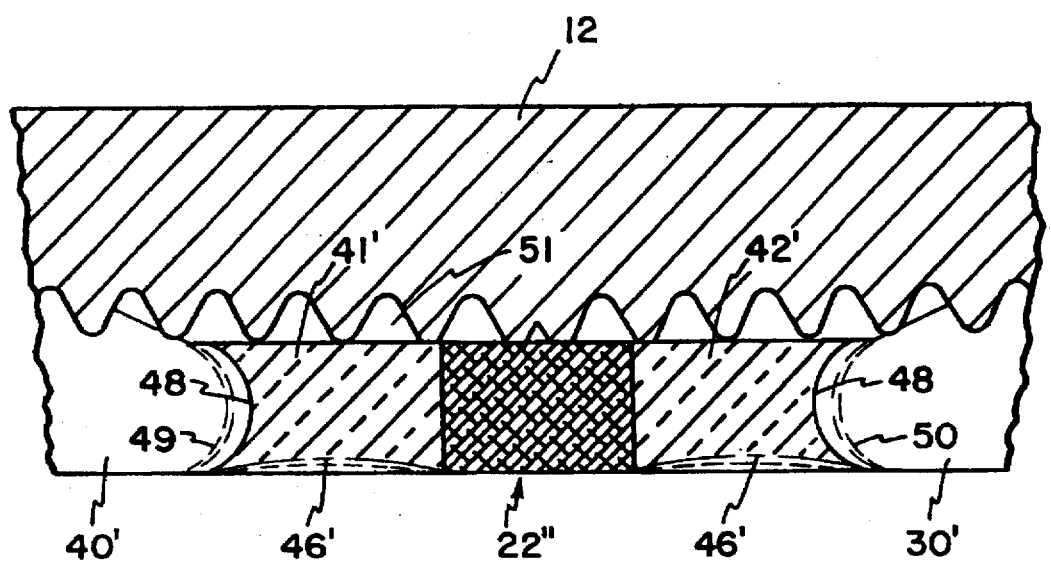
FIG. 6 is a fragmentary, side-sectional, view of the coupling of FIG. 1, showing the insert ring utilized for plastic lined couplings, having bullet noses.

An example of a coupling in accordance with the invention, referring now to FIGS. 1–3, is described as it applies to coupling first and second tubings 40, 30 of 8 inch round configuration and threaded in accordance with A.P.I. standards, as specified in the 37th edition of the A.P.I. specification for casing, tubing and drill pipe. The coupling or box 12 is said to have a mill end 1, in which the first tubing section 40 is threaded, the second tubing section 30 being threaded into the so-called field end 2 at the drill rig. The only other element used in this example is a central ring 22 against which the facing nose ends (34, 35) of the pins 30 and 40, respectively, are in abutment when the coupling is completed. The ring 22 may be forced into position within the box 12 fairly readily by manual means, but mechanical force, readily available at a drill site, is typically needed to remove it. In the example of FIGS. 1–3, a precision ring 22 is inserted, but in the example of FIG. 4, no ring 22 is placed within box 12 and the J-area 3 is open. For use with plastic coated or lined pipe, a different form of ring is employed as shown in the examples of FIGS. 5 and 6. In all instances, however, the box 12 has certain dimensional and body characteristics and thread dimension characteristics which are of significance. Referring now to FIG. 7, a number of physical dimensions of the body and thread are identified with alphabetic designations, also used below in conjunction with Table A. These designations are as follows:

N1 represents the axial length of the box 12 body.

W is the outer diameter of the box.

Q is the inner diameter of the end recess portion 4 formed in the ends 1 and 2 of the body 12.

M, also referred to as pitch diameter location, is the axial distance between the end 1, 2 of the body 12 and the mid point 5 of the inner taper 6 leading to the end recess 4 diameter.

$E_1$ is the diameter at the pitch diameter location.

q is the axial length of the end recess 4.

In addition to these body dimensions, the taper, lead, thread height, included thread angle and misalignment are all given in Table A as follows:

TABLE A

| | Tolerances | | |
|---|---|---|---|
| | Standard API 8 rd Coupling | "API" 8 rd Convertible Coupling of the present invention | API 8 rd Gauge |
| N1 | None Given | .010 | N/A |
| W | ±0.037 | ±0.010 | N/A |
| Q | None Given | ±0.005 | N/A |
| M | ±0.125 | ±0.025 | N/A |
| $E_1$ | ±0.0078 | ±0.0016 | ±0.0010 |
| q | None Given | ±0.005 | N/A |
| Taper | +0.0052 −0.0026 in/in | ±0.001 in/in | +0.0010 −0.0000 in/in |
| Lead | ±0.002 | ±0.0015 | ±0.0005 |
| Thread Height | +0.002 −0.004 | ±0.001 | N/A |
| Included Thread Angle | 1.5° | ±50' | ±10' |
| Misalignment | 0.0031 TIR | 0.009 TIR | N/A |

In Table A, the gauge value, which is only partially given for the A.P.I. 8 inch round, is to be taken as the nominal or target value with respect to which tolerances can be accepted.

It will be noted from FIGS. 7A and 7B and a comparison of the second and third columns of Table A that the dimensions given in the present convertible coupling have tolerances that are at least equal to those for the A.P.I. standard, and that in about half of the instances the tolerances are several times more precise.

In achieving an acceptable seal under field conditions, the example in which a metal-to-metal seal is obtained represents perhaps the most difficult operating function to achieve. The preloading of the pipe cannot be so high as to introduce deformation or affect hoop strength, or create galling in the threads. On the other hand, the high tensile forces introduced at the top of a long string can pull and deform the string so as to eliminate the seal. In this connection, it is found that a preloading stress of 3–4 times greater than the tension expected to be encountered maintains a seal with an adequate safety margin. Buttress thread is found to be less susceptible to deformation than is the round thread, but still must have in excess of a 3:1 preloading ratio, while the round thread must be somewhat higher. The machining and manufacture of the surface of the ring 22 in the metal-to-metal seal application must be more advanced than for the torque shoulder application, because of the need for a more precise axial dimension and for more precise sealing surfaces. While an axial dimension of ring 22 of 0.75 to 1.00 inches is feasible for the general case, the axial metal-to-metal seal is found to be most advantageously realized when the axial dimension of ring 22 is 0.880 inches, with only a few thousandths variation.

Figure 8:
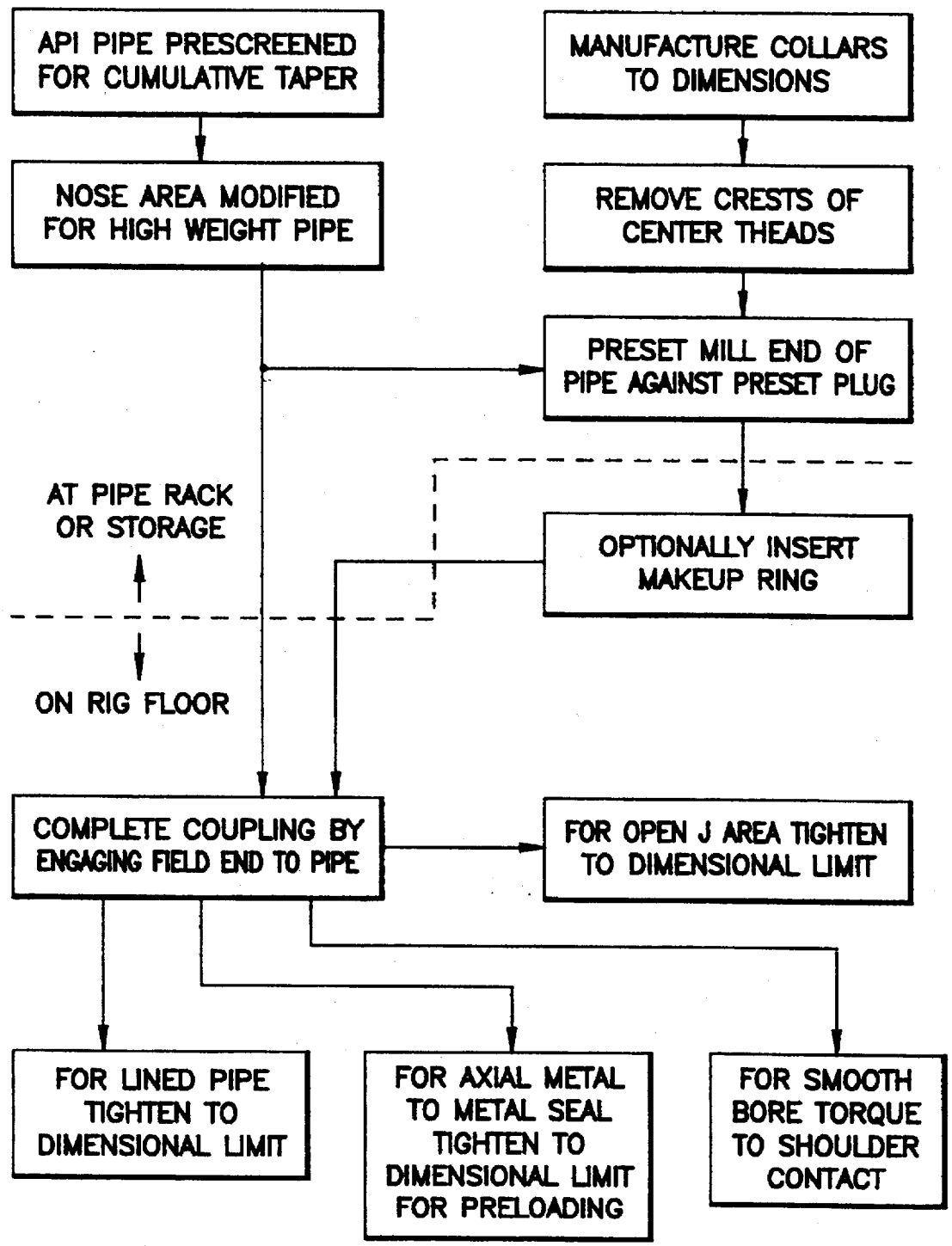
FIG. 8 is a block diagram of the steps and a method in accordance with the invention.
Figure 9A:
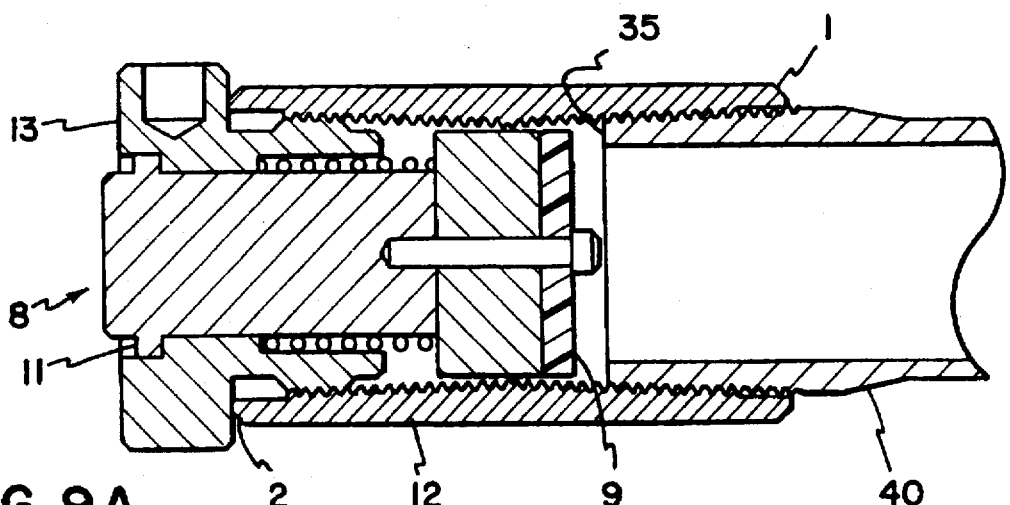
FIGS. 9a–9c depict cross-sectional views of a spring loaded gauge as used in positioning the tubular product within the coupling.
Figure 9B:
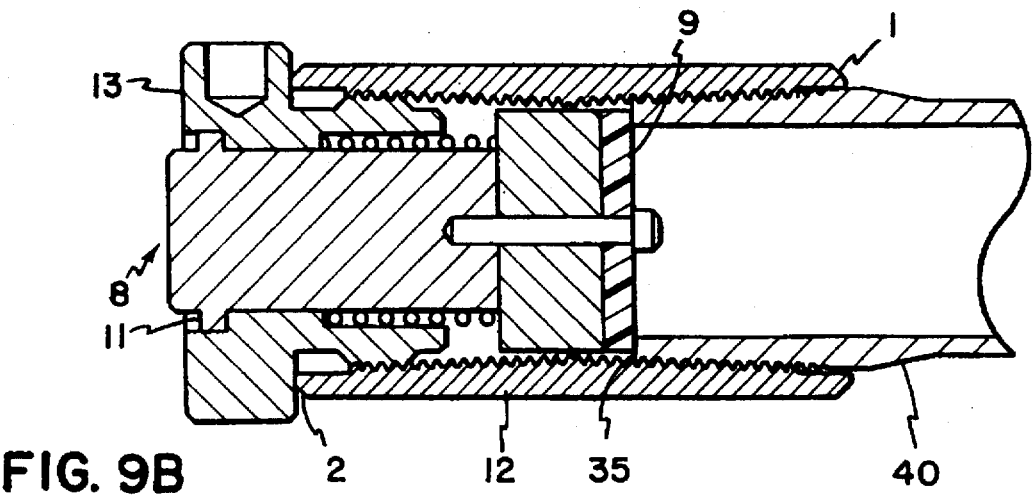
Figure 9C:
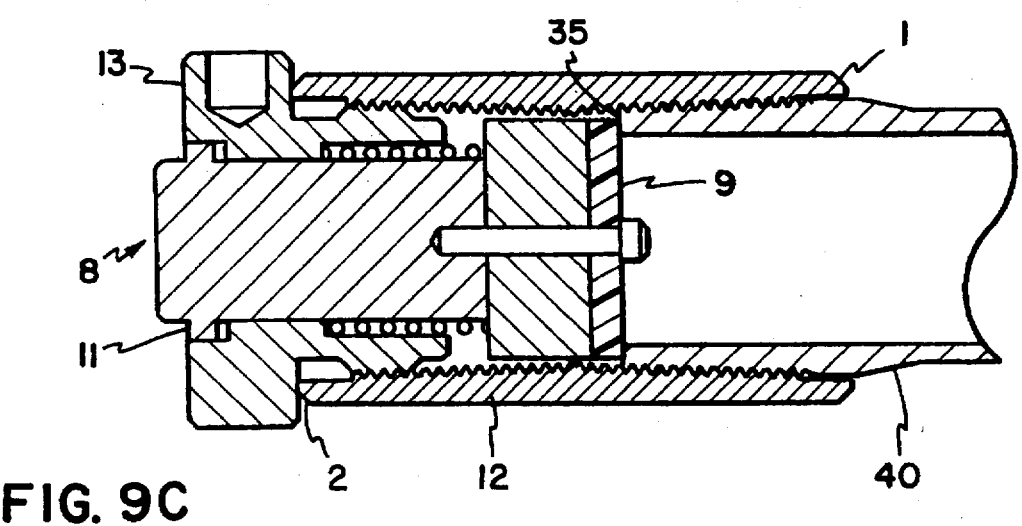
Figure 11:
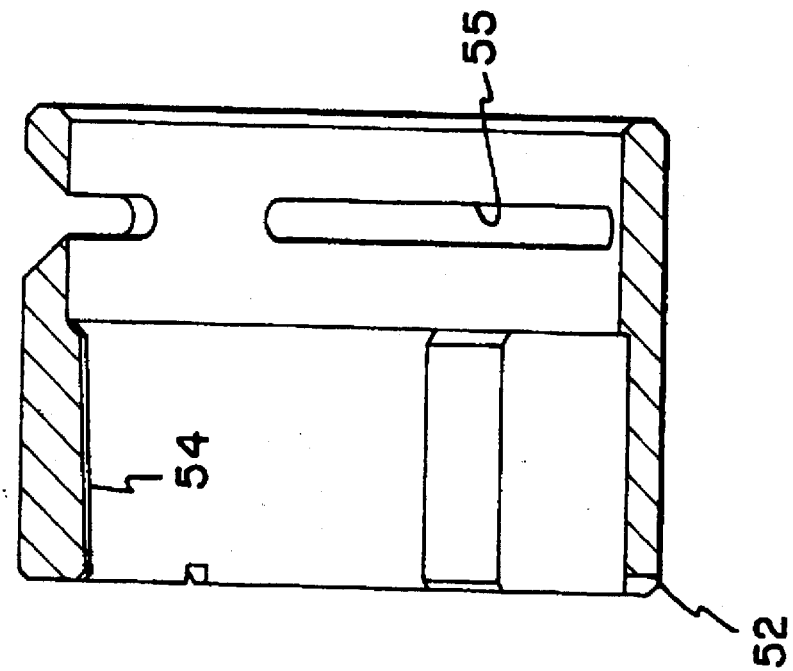
FIG. 11 is a side elevation of the marking gauge of FIG. 10.
Figure 10:
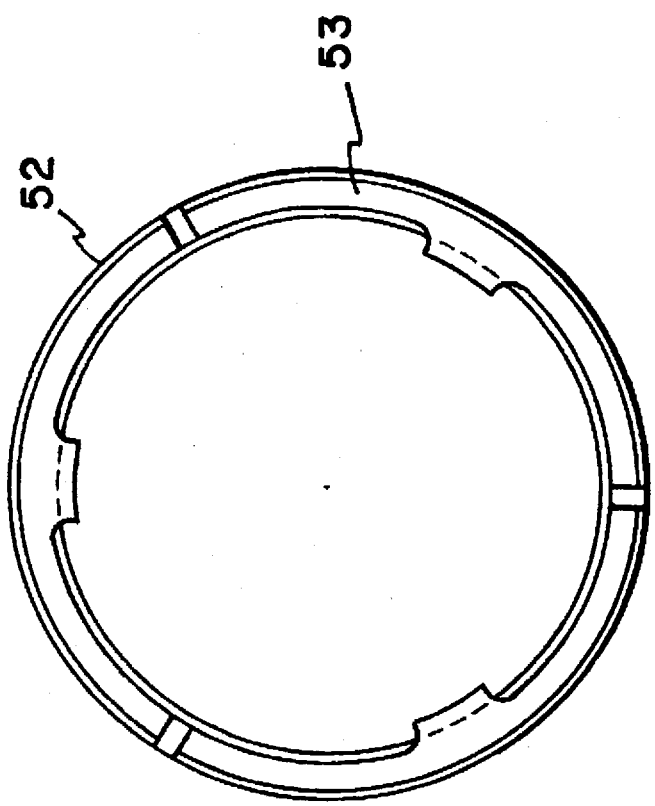
FIG. 10 is a front elevation of a marking gauge used for positioning pipe in accordance with the principles of the present invention.
Figure 12:
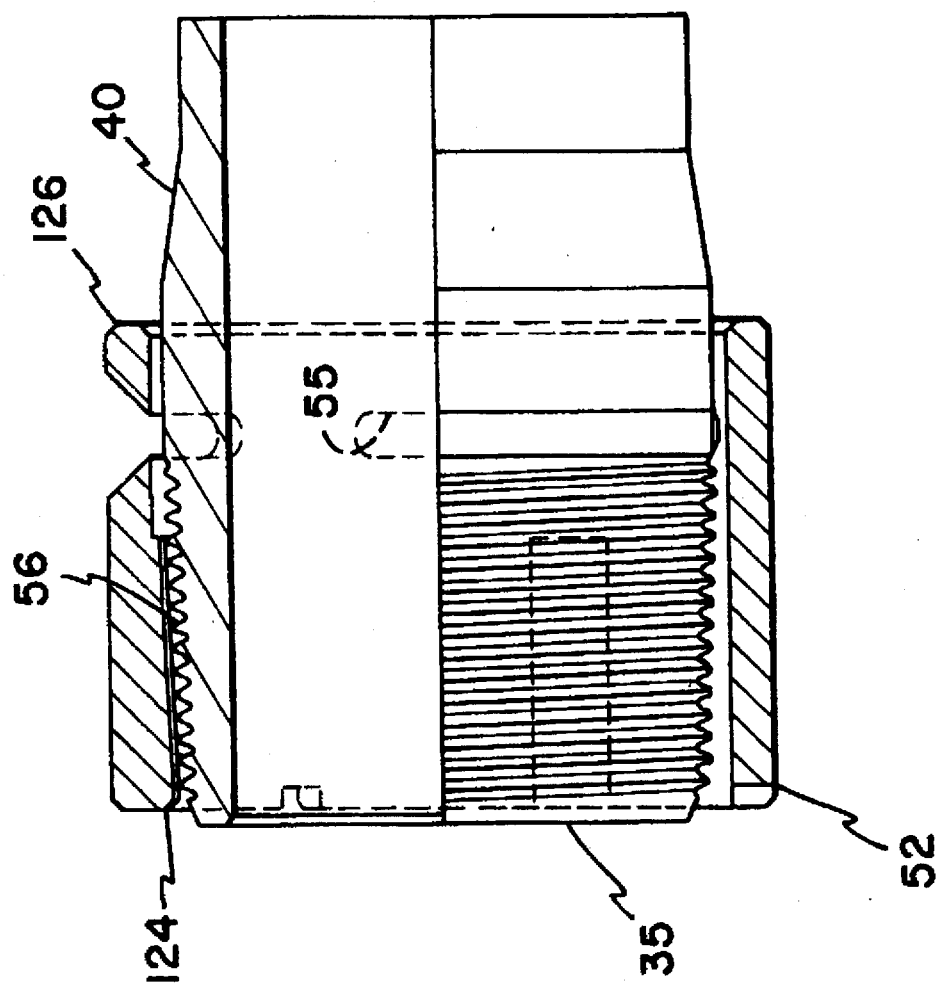
FIG. 12 is a partial sectional view showing the manner in which the marking gauge of FIGS. 10 and 11 is utilized in conjunction with a pipe.

Referring to FIG. 8, pertaining to the method of practicing the present invention, whatever the particular mode of coupling, the initials steps are essentially the same. Manufactured collars having the specified dimensions are prepared, and the center threads are removed in region 9 of collar 12. The central region 9 is then rethreaded to a depth of between 0.003 inches and 0.005 inches. The A.P.I. pipe is prescreened for what may be called cumulative taper dimensions, by placing a tool such as shown in FIGS. 10–12 over the end 34, 35 of the pipe 30, 40 in the threaded region. The tool 52 has a tapered interior diameter that converges inwardly from the end 126 which is applied onto the pin 30, 40. When fully seated, the nose end 34, 35 of the pin 30, 40 protrudes through the smaller end 124 of the tool 52, and a dimensional stencil on the side is formed by a slot 55 of precise width, approximately one-quarter inch wide in this example. The end 34, 35 of the pin 30, 40 should be aligned with or protruding less than 1/8" beyond the opening 124 of the gauge 52 or else the tolerance variations are too great and the pin cannot be used. Because the outer dimension of the threaded region as well as the angle of taper determine the point of contact with the precise inner surface of the gauge 52, the cumulative taper effect provides an accurate measure of whether the pipe, even though within tolerance from A.P.I. standards, is unsuitable for use in a dimensional make-up system such as disclosed in the present invention. One modification which is used with thick pipe (which may have an end surface area so large as to substantially reduce the localized pressure at the nose when the joint is made up) is to reduce the surface area of ring 22, thereby increasing localized bearing pressure. Referring to FIGS. 1–3 and also to FIG. 8, it is evident that with a prescreened first pin 40 for insertion in the mill end 1 of the box 12, make-up can proceed in usual fashion, manually threading the box 12 until reaching the handtight plane. In the present system, however, as seen in FIG. 9 and in the third step therefore in the right column of FIG. 8, a spring loaded bucking plug 8 is placed on the field end 2 of the collar 12, with a spring loaded end 9 protruding within box 12 in a position opposite to the nose end 35 of the first pin 40. Referring particularly to FIG. 9, the bucking plug 8 is referenced to the surface of the field end 2 of the box 12, so that when torque is applied to thread the first pin 40 into the box 12, contact is made with the spring loaded end 9 of the bucking plug 8, to close an electrical circuit (not shown) and generate a signal that indicates that adequate insertion has been reached. This corresponds to the alignment of movable surface 11 with fixed surface 13 as shown in FIGS. 9a–9c. This arrangement does not preload the bucking plug 8, or require a high level of torque for dimensional make-up. Thus, the bucking plug 8 may be removed and the unit formed by pipe 40 and collar 12 can then be transported to the field.

As seen in FIG. 8, all of the remaining operations can take place at the field installation, or on the rig floor.

In the field, the decision can be made as to whether to use an optional insert ring, and if so, of what type. All four modes of operation are possible, although if the field end is to be a coated or lined pipe, then the mill end pipe 30 must have been installed with the same characteristics. Otherwise, the J-area 3 can be left open by not using a center ring 22, a less expensive ring can be utilized for smooth bore, torque shoulder operation, or more precise axial metal-to-metal seal ring can be employed. It will be recognized that both ends of the pipe are prescreened, and at the base or mill installation dimensional marks at a given distance from the nose end of the pin may be sprayed on for use as guidance in completing the dimensional make-up.

Referring again to FIGS. 10–12, the slip on gauge 52 is formed having a cylindrical body 53, the inside diameter of which is slightly greater than the end of the standard A.P.I. pipe being examined. Inner wall 54 is tapered slightly, so as to permit engagement with the threaded surface 56 of pipe 40. The gauge 52 slides over pipe 40 until the gradually narrowing diameter of gauge 52 prevents further engagement. At this point, slot 55 exposes a region of the unthreaded surface of pipe 40. By marking pipe 40 through slot 55, when gauge 52 is fully engaged, a mark is left which defines the correct position of the edge of collar 12 when the pipe 40 is fully engaged with collar 12. The proper depth of insertion is dependent on tubing diameter and thread con-figuration. At the drill rig, therefore, the added section of pipe is stabbed from above into the mill end 1 of the box 12, and the second pin 30 is torqued into position until the dimensional mark is in alignment with the field end 2 of the box 12. Only if the ring 22 is used as a torque shoulder, so that threading can be stopped when the shoulder is encountered, or continued for a specified increase in torque or added number of turns thereafter, can the operation proceed independently of the dimensional mark. Obviously, the dimensional mark provides a far superior way to the use of high technology instrumentation and measuring systems, because of the speed and reliability of measurement. However, this is dependent on the dimensional and bearing characteristics imparted by the configuration of the present invention.

It should be noted that the center ring 22 is under balanced stresses from both sides, so that the seals at each abutting shoulder are of equal pressure. The target value for dimensional tightening of the pins is 2.48 turns.

The target tightening of the pin added to the field end is that achieved upon reaching the handtight plane plus 2.48 turns (±0.015 inches). Tightening cannot be so great as to induce failure, which in steel components is influenced by each of six possible stresses, three therefore orthogonal or normal stresses and three corresponding shear stresses. Various theories of failure have been developed that allow these stress components to be combined into a single value that can be used to predict when yielding will occur or when some percent of the yield strength has been consumed. Failure is assumed to occur when the single combined value reaches or exceeds the yield strength of the material of interest. The Von Mises failure theory is the most accurate for ductile steels. The three stresses that occur when loading the collar 12 in tension are hoop stress caused during assembly, axial stress from tension, and shear stress in the threads that are required to transfer the tension through the connection.

Analyzing the configuration by finite element analysis, this gives a Von Mises equivalent stress that is everywhere less than 90% of the yield strength value for steel.

Figure 4:
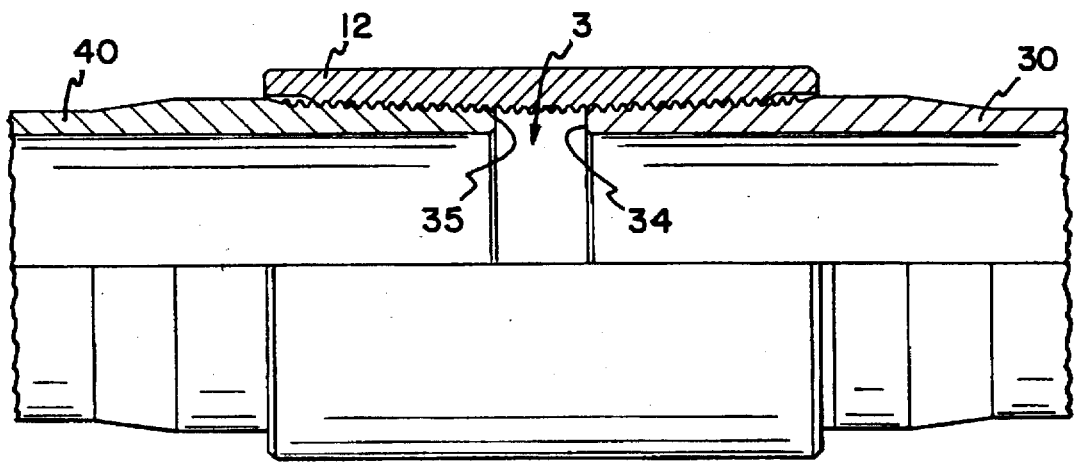
FIG. 4 is a side cross-sectional view of the arrangement of FIG. 1, with an open J-area.

The tubing or casing configuration of FIG. 4, with the open J-area between the first pin 40 and the opposed end 34 of the second pin 30, is useful wherever internal pressure and environment do not differentially deform the pins 40, 30 and box 12, or introduce corrosive factors into the thread helix.

In the arrangement of FIG. 5, the pins 40, 30 are shown in fully inserted position, with the initial position of ends 35 and 34 being shown by dotted lines 35a and 34a, respectively. The ring 22' is here made up of three separate sections, including "Teflon®" outer rings 41, 42 and a separate center rigid ceramic element 44 of "Torlon®" or "Peek™", these being trademarks of E. I. DuPont, Amoco, and Imperial Chemical Industries respectively. "Torlon®" and "Peek™" are rigid materials of some brittleness, and the "Teflon®" rings serve as a barrier along with the center ring 44. However, the "Teflon®" is not seal material, but is a corrosion barrier, the original concave surfaces 46 being straightened to a flat surface, flush with the inner diameter of the pins 40, 30 when the arrangement is tightened. The border 60, 61 between the Teflon 41,42 and the center ring 44 permits gas to permeate past the rings 41 and 42, thereby relieving any gas pressure differential that may exist between the interior of the pipe string and the region 51 formed between seal 22' and the wall of collar 12. These elements are preferably of axial dimensions of 0.300 inches for the "Teflon" rings and 0.280 inches for the "Torlon" or equivalent "Peek". The rings 41, 42, 44 of FIG. 5 are used in conjunction with PVC lined or cement lined pipe, which has flat noses. In FIG. 6, on the other hand, the rings are to be utilized with a bullet-nosed pipe 40', 30', of the type typically employed for use with plastic interior coatings that extend around the nose end. The Teflon® rings 41' and 42', each have concave ends 48 for registering with the convex bullet ends 49 and 50 of the tubular goods 40', 30'.

Changes may be made in the construction of the embodiments disclosed herein without departing from the spirit or scope of the invention as defined in the following claims.

I claim:

1. A method of converting a string of A.P.I. standard threaded tubing or casing so as to render it capable of being used in a given application meeting specific mechanical or corrosion resistance conditions that are more demanding than those specified by A.P.I. for the tubing or casing, wherein the tubing or casing pins are coupled together by collars, comprising the steps of:

forming a collar having A.P.I. standard internal threads extending from the collar ends toward and meeting at a central region, the crests of the threads in the central region being truncated to flattened surfaces defining a given diameter central bearing area with a constant maximum diameter defined by the flattened surfaces, without reduction of the effective length of the thread bearing region extending from each end, the length of the collar and the thread taper and thread cone in the thread bearing region being precisely controlled, said central bearing area being adapted for selectively receiving one of a number of different types of interior rings, said one interior ring having a selected length;

measuring mill pin ends of A.P.I. tubing or casing to use only those in which thread taper and dimension provide a fit not only within A.P.I. tolerance but also within predetermined limits tighter than the A.P.I. tolerance;

threading a first pin end into a mill end of the collar to a selected number of turns of engagement after the hand tight plane;

threading a second pin end into a field end of the collar to a selected number of turns of engagement after the hand tight plane; and repeating the steps of threading pin ends into the mill and field ends of a plurality of formed collars to build up the string for the given application;

whereby a ring can be incorporated by inclusion in the central bearing area after the first pin is inserted to convert the central region of the collar to a smooth bore, a metal-to-metal seal or uninterrupted internally coated pipe; or by coupling the tubing or casing ends together without the interior ring, to enable use of the string of tubing or casing in applications requiring better properties and performance than that which can be provided by a string using the same tubing or casing but employing A.P.I. standard collars for coupling the successive tubing or casings.

2. The method of claim 1 further including the step of inserting a ring into the central bearing area which is of a length selected to provide positional control of the pins to determine the degree of engagement of the tubing or casing threads relative to the collar threads and to establish metal-to-metal sealing between the pins and the ring, the ring having an outer circumference in contact with the crests of the truncated threads and an inner diameter substantially matching that of the tubing or casing to promote laminar flow by reducing turbulence under high velocity fluid flows within the tubing or casing, so as to mitigate erosion effects and contain higher pressures than A.P.I. threads can by themselves.

3. A method of providing couplings for A.P.I. standard tubing or casing lengths each having first and second threaded ends in which the threads are in accordance with predetermined A.P.I. tolerances including pitch, taper and thread profile, the couplings incorporating collars having internally threaded first and second ends defining thread bearing regions meeting in a central region wherein the crests of the threads in the central region are truncated to flattened surfaces defining a central interior bearing region of a given inner diameter while the full effective thread bearing regions are retained, the dimensions of the collar length and the internal threads being within predetermined tolerances selected to be more restrictive than A.P.I. tolerance limits for acceptable collars, comprising the steps of:

prescreening the A.P.I. tubing or casing to reject those in which thread taper and dimension are greater than predetermined limits even though still within A.P.I. tolerance limits;

partially assembling tubing or casing lengths together with individual collars, by first threading a first end of each tubing or casing into the first end of a precision collar to a selected number of turns of engagement past the hand tight plane; and then assembling a string from the partially assembled elements and collars by threading a second end of a different tubing or casing into the second end of a precision collar previously attached at its first end to a different tubing or casing length into a predetermined relation to the inserted end of the first tubing or casing and repeating the sequence with further tubing or casing lengths and collars, whereby a string of coupled tubing or casing is assembled having enhanced physical and sealing properties relative to a standard A.P.I. coupling string because thread bearing engagement and sealing throughout the string exceeds that which can be derived when using only the variations which are allowed by A.P.I. tolerances.

4. The method as set forth in claim 3, including the additional steps of interposing a central metal ring of predetermined length in the central region of the collar against the inserted first end of a tubing or casing length, then threading in the second tubing or casing length to contact with the ring with sufficient pressure to provide axial metal-to-metal sealing between the ring and the ends of the tubings or casings to contain higher pressures than can be achieved by A.P.I. threaded connections with the same tubings or casings.

5. The method as set forth in claim 4, wherein the tubing or casing lengths are internally coated and the interposed ring has an interior diameter substantially equal to the interior diameter of the tubings or casings and is also internally coated.

6. A method of upgrading the applicable usage of A.P.I. standard threaded tubings and casings for a given application meeting specific mechanical or corrosion resistance conditions that are more than those specified for the same A.P.I. standard tubings and casings including the steps of:

forming a collar having a collar length and with A.P.I. standard compatible internal threads extending from mill and field ends of said collar toward a central thread region, with said collar length and said internal threads being within tolerances selected to be more precise than A.P.I. standard tolerances;

providing said central thread region of said collar with flattened thread crests defining a given diameter central bearing area having a constant maximum diameter at the flattened crests;

prescreening threaded ends of A.P.I. standard tubings and casing and selecting only those tubings and casings having a thread taper and dimension within specific limits that are tighter than standard A.P.I. tolerance;

partially assembling each of said selected tubings and casings with one of said collars by threading a first end of each said selected tubing or casing into a mill end of one of said collars to a selected number of turns;

optionally installing one of a number of different types of interior rings into said central bearing area of each said collar with an outer diameter of said selectively installed ring being in close engagement with said flattened thread crests in the central bearing area such that said selectively installed interior ring will be engageable with said first end of said tubing or casing; and assembling a plurality of said selected tubings or casings and collars by threading said second ends of said selected tubings or casings into said collars previously partially assembled with said first ends of said tubings or casings to form a string of said assembled tubings or casings and collars with said string having physical and sealing properties better than those provided by a standard A.P.I. coupling string.

7. The method as set forth in claim 6 above, wherein the inner diameter at the flattened crests is no greater than the inner diameter of any of the threads of the collars such that a ring can be inserted through the collar past the threads to be in engagement with the flattened crests, and wherein the axial length of an inserted ring is selected to be of a dimension such that the second ends of the tubings or casings are positioned at desired limits when brought into engagement with the ring inserted in the collar into which it is threaded.a

* * * * *

UNITED STATES PATENT AND TRADEMARK OFFICE
CERTIFICATE OF CORRECTION

PATENT NO. : 5,689,871

DATED : November 25, 1997

INVENTOR(S) : K. Carstensen

It is certified that error appears in the above-identified patent and that said Letters Patent is hereby corrected as shown below:

Col. 3, line 41, – Delete the word "desireable" and replace with —desirable—.

Col. 4, Line 18 – Delete the word "Teflon" and replace with —Teflon®—.

Col. 8, Line 67 – Delete the word "Teflon" and replace with —Teflon®—.

Col. 8, Line 67 – Delete the word "Torlon" and replace with —Torlon®—.

Col. 6, Line 5 – Delete the abbreviation "API" and replace with —A.P.I.—.

Col. 6, Line 7–2x's – Delete the abbreviation "API" and replace with —A.P.I.—.

Col. 6, Line 19 – Delete the numbers "1.5" and replace with —$\pm 1.5°$—.

UNITED STATES PATENT AND TRADEMARK OFFICE
CERTIFICATE OF CORRECTION

PATENT NO. : 5,689,871

DATED : November 25, 1997

INVENTOR(S) : K. Carstensen

It is certified that error appears in the above-identified patent and that said Letters Patent is hereby corrected as shown below:

Col. 7, Line 24 – Insert the following lines —the first pin, inserted in the mill end, is present against a preset plug. For this purpose— after the word "Fig. 8".

Col. 7, Line 49 – Insert the words —therefore a— after the word "or".

Col. 8, Lines 53 and 55 – Delete the word "Peek™" and replace with —Peek®—.

Col. 8, Line 61 – Delete the word "Teflon" and replace with —Teflon®—.

Col. 9, Line 1 – Delete the word "Peek" and replace with —Peek®—.

Claim 7, Line 19 – Delete the word "a" after the word "threaded."

Claim 3, Line 31 – Delete the word "of" and replace with —past—.

Signed and Sealed this

Sixth Day of October, 1998

*Attest:*

BRUCE LEHMAN

*Attesting Officer*   Commissioner of Patents and Trademarks